United States Patent
Chan et al.

(10) Patent No.: US 10,908,892 B2
(45) Date of Patent: Feb. 2, 2021

(54) GENERATING AND DEPLOYING OBJECT CODE FILES COMPILED ON BUILD MACHINES

(71) Applicant: INTERNATIONAL BUSINESS MACHINES CORPORATION, Armonk, NY (US)

(72) Inventors: Keith Chan, San Francisco, CA (US); Christopher T. Vogan, Cedar Park, TX (US); Wilson Yang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/351,413

(22) Filed: Mar. 12, 2019

(65) Prior Publication Data
US 2020/0293297 A1    Sep. 17, 2020

(51) Int. Cl.
*G06F 9/44*    (2018.01)
*G06F 9/445*   (2018.01)
(Continued)

(52) U.S. Cl.
CPC ............... *G06F 8/65* (2013.01); *G06F 8/315* (2013.01); *G06F 8/47* (2013.01)

(58) Field of Classification Search
CPC ............... G06F 8/65; G06F 8/315; G06F 8/47
See application file for complete search history.

(56) References Cited

U.S. PATENT DOCUMENTS

| 8,037,360 B2 | 10/2011 | Rusmanov |
| 8,091,066 B2 | 1/2012  | Fiore    |

(Continued)

FOREIGN PATENT DOCUMENTS

CN    104978191 A    10/2015

OTHER PUBLICATIONS

Sander van der Burg, Automating System Tests Using Declarative Virtual Machines, 2010, pp. 181-190. https://ieeexplore.ieee.org/stamp/stamp.jsp?tp=&arnumber=5635141 (Year: 2010).*

(Continued)

*Primary Examiner* — Mongbao Nguyen
(74) *Attorney, Agent, or Firm* — David W. Victor; Konrad Raynes Davda & Victor LLP (57) ABSTRACT

Provided are a computer program product, system, and method for generating and deploying code files compiled on build machines. Source code is maintained at a deployment system. Commands are sent to build machines to compile the source code into object code. The build machines have different operating systems to compile the object code. The deployment system stores the object code for each build machine in an object code file directory to provide executable object code for an operating system installed at the build machine. Different object code file directories are maintained for the object code compiled by the build machines having different operating systems. Access is provided to the object code in the object code file directories to run-time machines. Each run-time machine accesses the object code file directory in the deployment system having the object code compiled for an operating system version deployed on the run-time machine.

18 Claims, 5 Drawing Sheets

(51) Int. Cl.
*G06F 8/65* (2018.01)
*G06F 8/30* (2018.01)
*G06F 8/41* (2018.01)

(56) References Cited

U.S. PATENT DOCUMENTS

| | | | |
|---|---|---|---|
| 8,645,326 | B2 | 2/2014 | Weizman et al. |
| 8,732,665 | B2 | 5/2014 | Vedula et al. |
| 9,110,737 | B1* | 8/2015 | Tibble ............... G06F 8/54 |
| 10,083,025 | B2 | 9/2018 | Weber et al. |
| 10,216,512 | B1* | 2/2019 | Mathew ............ G06F 8/41 |
| 10,572,245 | B1* | 2/2020 | Doebel ............. G06F 8/71 |
| 10,572,249 | B2* | 2/2020 | Brebner ............ G06F 8/73 |
| 2006/0080635 | A1* | 4/2006 | Anwar ........... G06F 9/44521 717/100 |
| 2006/0080682 | A1* | 4/2006 | Anwar ........... G06F 9/44521 719/331 |
| 2011/0271270 | A1* | 11/2011 | Bowen ........... G06F 9/45558 717/171 |
| 2014/0053148 | A1* | 2/2014 | Chan ................. G06F 8/41 717/174 |
| 2016/0321055 | A1* | 11/2016 | Mihalcea ........... G06F 8/24 |
| 2016/0357536 | A1* | 12/2016 | Firlik ............... G06F 9/54 |
| 2017/0060702 | A1* | 3/2017 | Dave ............... G06F 11/14 |
| 2017/0124073 | A1* | 5/2017 | McKenzie ........ H04L 67/06 |
| 2018/0173522 | A1* | 6/2018 | Hamill ............. G06F 8/60 |
| 2018/0253292 | A1* | 9/2018 | Doherty ........... G06F 8/71 |
| 2019/0205105 | A1* | 7/2019 | Jensen ............. G06F 8/41 |
| 2020/0019410 | A1* | 1/2020 | Dima .............. G06F 9/448 |

OTHER PUBLICATIONS

Dan Kimmel, Weenix, Brown University Department of Computer Science, 2018, pp. 1-79. https://cs.brown.edu/courses/cs167/content/weenix-doc.pdf (Year: 2018).*

Sophon Mongkolluksame, A Management System for Software Package Distribution, 2012, pp. 3529-3525. https://ieeexplore.ieee.org/stamp/stamp.jsp?tp=&arnumber=6304372 (Year: 2012).*

Van Der Burg, et al., "Declarative Testing and Deployment of Distributed Systems," Report TUD-SERG-2010-020, Delft University of Technology, Software Engineering Research Group, Technical Report Series, 2010, pp. 14.

English Machine Translation of CN104978191, published Oct. 14, 2018, pp. 30.

* cited by examiner

GENERATING AND DEPLOYING OBJECT CODE FILES COMPILED ON BUILD MACHINES

BACKGROUND OF THE INVENTION

1. Field of the Invention

The present invention relates to a computer program product, system, and method for generating and deploying code files compiled on build machines.

2. Description of the Related Art

Software developers need to deploy source code to different operating system platforms to compile the object code for different operating systems. For instance, software may be developed for multiple platforms (e.g., Linux®, AIX®, z/OS®, Solaris®, Windows®, etc.), and each platform has different operating system levels (e.g. AIX7.1/AIX7.2), and each operating system level may have different maintenance builds (e.g., AIX7 7100-09, AIX7 7200-02). The developer may deploy the source code to the different platforms having different operating systems, operating system levels and builds to compile the source code to object code to test on the different operating systems. (Linux is a registered trademark of Linus Torvalds, AIX and z/OS are registered trademarks of International Business Machines Corporation, Foundation, Windows is a registered trademark of Microsoft Corporation, and Solaris is a registered trademark of Oracle Corporation throughout the world).

There is a need in the art for improved techniques for deploying source code to compile on different operating system platforms.

SUMMARY

Provided are a computer program product, system, and method for generating and deploying code files compiled on build machines. Source code is maintained at a deployment system. Commands are sent to build machines to compile the source code into object code, wherein the build machines have different operating systems to compile the object code for operating systems installed on the build machines. The deployment system stores the object code for each build machine in an object code file directory for the build machine to provide executable object code for an operating system installed at the build machine, wherein different object code file directories are maintained for the object code compiled by the build machines having different operating systems. Access is provided to the object code in the object code file directories to run-time machines. Each run-time machine accesses the object code file directory in the deployment system having the object code compiled for an operating system version deployed on the run-time machine.

DETAILED DESCRIPTION

In current systems, the source code and object code may be distributed among the different platforms on which the object code is compiled. However, this can be resource consuming because each variation of the operating system platforms store the source and object code files, that must be deployed to other machines to execute and test.

Described embodiments provide improvements to computer technology for deploying source code to build machines to compile the source code by sending remote commands to the build machines to compile the source code at the deployment system into object code for the operating systems on the build machines. Described embodiments improve management and consolidate storage of the object code files by maintaining a directory in the deployment system for each of the build machines to store the object code files for different operating system versions on which the object code files were compiled at a central location in the deployment system. The object code files are then provided to run-time machines to mount the object code files from the deployment system to access remotely using a network file system protocol or similar network file access protocols.

The described embodiments provide an improved deployment tool to automatically deploy unlimited versions of source and executable code (by remotely utilizing the compilers on networked build machines), to unlimited number of run-time machines, such as virtually by using network file system mounts. A network file system protocol refers herein to any network file system protocol known in the art, including Network File System (NFS), General Parallel File System (GPFS), Server Message Block (SMB, also termed CIFS), Apple Filing Protocol (AFP), NetWare Core Protocol (NCP), and OS/400 File Server file system (QFileSvr.400), etc. Described embodiments allow cross platform deployment of the source code for compilation on different operating system platforms while maintaining central storage of the source code, for code and executable integrity, such that the build machines can point to the same remote target location on the deployment system for source code without having to maintain independent copies.

The described embodiments further conserve storage space on the build machines and use common network file access services to allow remote access to the source code files and object code files. In this way, the run-time machines on which the object code may be deployed may only access the single copy of the object file on the deployment system.

Figure 1:
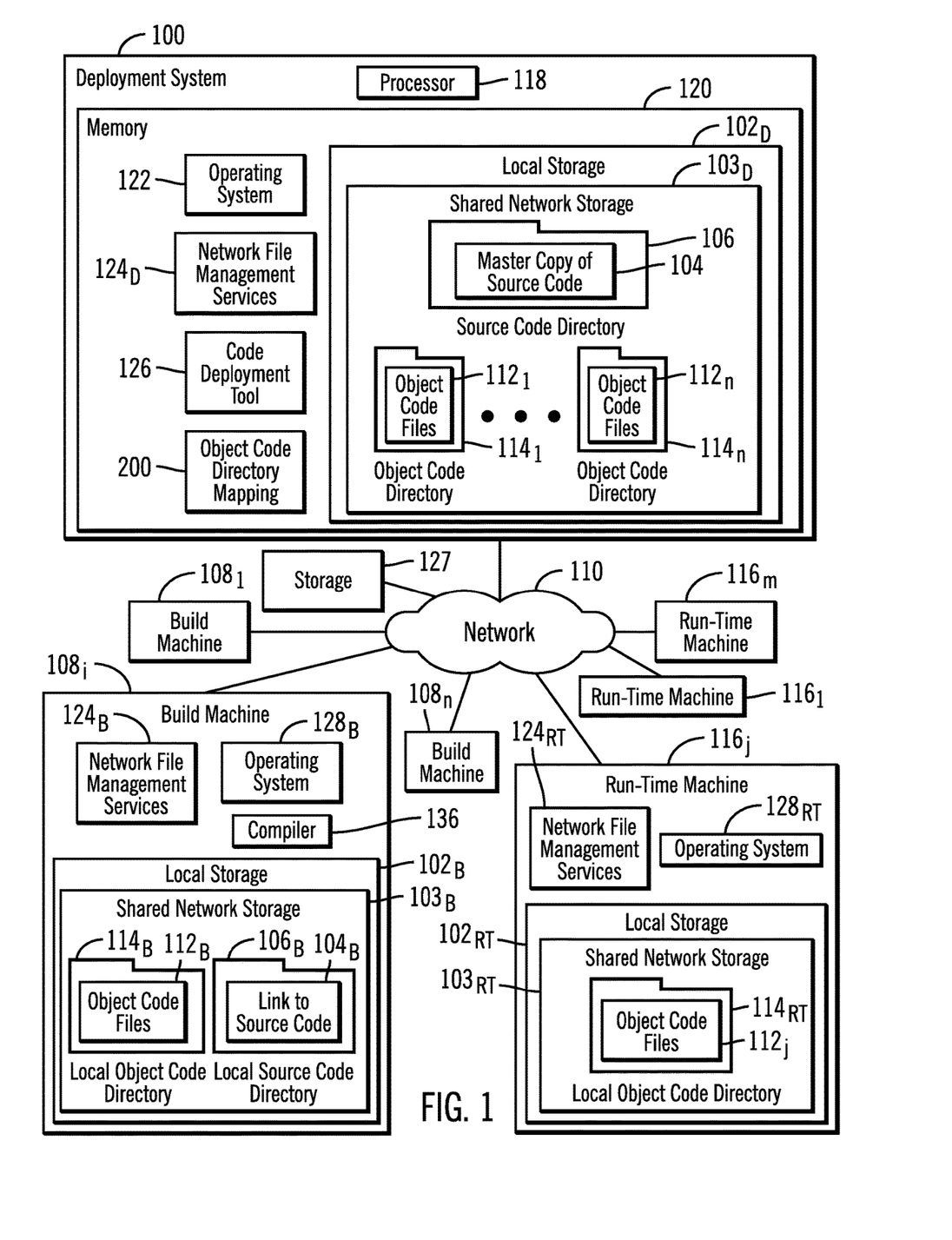
FIG. 1 illustrates an embodiment of a distributed software development environment.

FIG. 1 illustrates an embodiment of a program development computing environment having a deployment system 100 providing a local storage $102_D$, such as a distributed file system, that includes a shared network storage $103_D$ to share a master copy of source code 104 in a source code directory 106 with build machines $108_1, 108_1 \ldots 108_n$ over a network 110. The build machines $108_1, 108_i \ldots 108_n$ may implement heterogeneous operating systems, such as different versions and builds of an operating system, to compile the source code 104 into object code files $112_1 \ldots 112_n$ in object code directories $114_1 \ldots 114_n$ on deployment system 100 exported as shared network storage $103_D$. Run-time machines $116_1, 116_j \ldots 116_m$ may access and execute the object code files $112_1 \ldots 112_n$ compiled by the build machines $108_1, 108_1 \ldots 108_1$ over the network 110 to test or for other purposes. The deployment system 100, build machines $108_1, 108_i \ldots 108_n$, and run-time machines $116_1, 116_j \ldots 116_m$ communicate over the network 110.

The source code directory 106 include symbolic links (symlinks) for the files therein $112_1$ and 104, comprising a text string that provides a path to the directories in the local storage $102_D$ having the files $112_i, 104_i$. The symbolic link may comprise an additional file that exists independently of the target file it represents.

The deployment system 100 has a processor 118 comprising one or more processor cores that execute programs loaded in a memory 120, including an operating system 122, network file management services $124_D$ to implement the shared network storage $103_D$ to share files in the local storage $102_D$ and which may be part of the operating system 122, a code deployment tool 126 to manage the compiling of object code files on the build machines $108_1 \ldots 108_n$ and access to object code files $112_i$ to the run-time machines $116_1 \ldots 116_m$, and object code directory mapping 200 that maps operating system versions to object code directories $112_1 \ldots 112_n$. The files, such as 104 and $114_1 \ldots 114_n$ are stored locally in the deployment system 100 or in a storage 127, also referred to as a source code repository, accessible to the deployment system 100 and represented as files in directories in the local storage $102_D$.

Each build machine $108_1 \ldots 108_n$ may include components as shown in build machine $108_i$, including an operating system $128_B$, network file management services $124_B$ to mount a shared network storage $103_B$ in a local storage $102_B$ having a local source code directory $106_B$ that links to the source code directory 106 in the local storage $102_D$ at the deployment system 100. A local object code directory $114_B$ is mounted from the object code directory $114_i$ shared network storage $103_D$ in the local storage $102_D$ at the deployment system 100, and a compiler 136 to compile the source code 104 through a link to the source code $104_B$ in the local source code directory $106_B$ that links to the source code 104 in the deployment system 100 into object code files $112_B$ transferred to the object code directory 114 in the remote storage $102_D$ on the deployment system 100.

Each run-time machine $116_1 \ldots 116_m$ may include components such as shown in run-time machine $116_j$, including an operating system $128_{RT}$, network file management services $124_{RT}$ to mount a shared network storage $102_E$ to the local object code directory $114_{RT}$ to access the object code files for the host operating system $128_{RT}$ for running on the run-time machine $116_j$.

In one embodiment, the run-time machines $116_1 \ldots 116_m$ may comprise test systems to test execution and operations of the object code files $112_1 \ldots 112_m$ for the different operating systems $128_{RT}$ at the run-time machines $116_j$ for which the object code files $112_j$ were compiled. In this way the build machines $108_i$ compile the common source code 104 into object code files $112_i$ for the different operating systems so that run-time machines $116_j$ running the different operating systems $128_{RT}$ can test the object code files $112_j$ generated for the different operating systems as part of the development of the source code 104. With the described embodiments, a single copy of the source code 104 and object code files $112_i$ for different operating systems is maintained at the deployment system 100 for execution and processing at different run-time machines $116_j$.

In further embodiments, the object code may be deployed at the run-time machines $116_i$ for non-testing purposes, such as a distributed application in a production environment.

The shared network storages $103_D, 103_B, 103_{RT}$ 102 and network file management services $124_D, 124_B, 124_{RT}$, allow the sharing of the files in the local storage $102_D$ across systems in the network, allowing the build $108_i$ and run-time machines $116_j$ to access the source code 104 and object code files $112_i$ remotely over the network 110. Other suitable distributed file system protocols may also be used instead of NFS, including, but not limited to, the Server Message Block (SMB, also termed CIFS), GPFS, Apple Filing Protocol (AFP), NetWare Core Protocol (NCP), and OS/400 File Server file system (QFileSvr.400), etc.

Build machines $108_i$ may also function as run-time machines and run object code files $112_i$ stored remotely in the deployment system 100. Further, the run-time machines $116_1 \ldots 116_m$ may also function as build machine and run object code files $112_i$ stored remotely in the deployment system 100.

The network 110 may comprise a network such as a Storage Area Network (SAN), Local Area Network (LAN), Intranet, the Internet, Wide Area Network (WAN), peer-to-peer network, wireless network, arbitrated loop network, etc.

The memory 120 may comprise a suitable volatile or non-volatile memory for storing programs to execute and information used by the programs to execute. In further embodiments where the deployment system 100 comprises a virtual machine, the memory 120 may comprise virtual memory.

The local storages $102_D, 102_B, 102_{RT}$ may be implemented in memory and storage devices, such as one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The programs 122, $124_D$, 126, $128_B$, $124_B$, 136, $124_{RT}$, $128_{RT}$ may comprise program code loaded into memory and executed by a processor. Alternatively, some or all of the functions may be implemented in hardware devices, such as in Application Specific Integrated Circuits (ASICs) or executed by separate dedicated processors.

Although a certain number of instances of elements are shown, such as one deployment system 100, build machines $108_i$, and run-time machines $116_i$, there may be any number of these elements.

Figure 2:
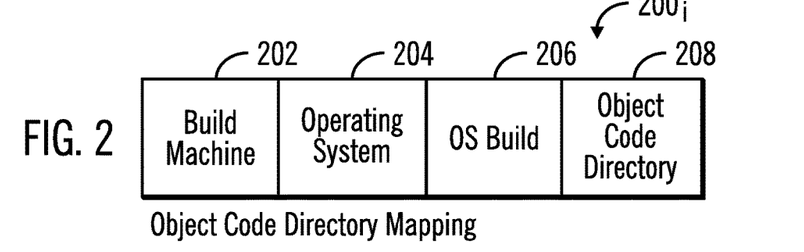
FIG. 2 illustrates an embodiment of an instance of an object code directory mapping.

FIG. 2 illustrates an embodiment of an instance of an object code directory mapping $200_i$ in the object code directory mapping 200 having information on the object code directory $114_i$ having object code files $112_i$ for an operating system, and includes: a build machine 202 which compiled the source code 104; an operating system on the build machine 202 that compiled, such as the type or brand of operating system; an operating system build number or version 206, such that an operating system version may comprise the operating system 204 and build/version 206;

and the object code directory 208 in the local storage $102_D$ having the object code files $112_i$ compiled by the build machine 202.

Figure 3:
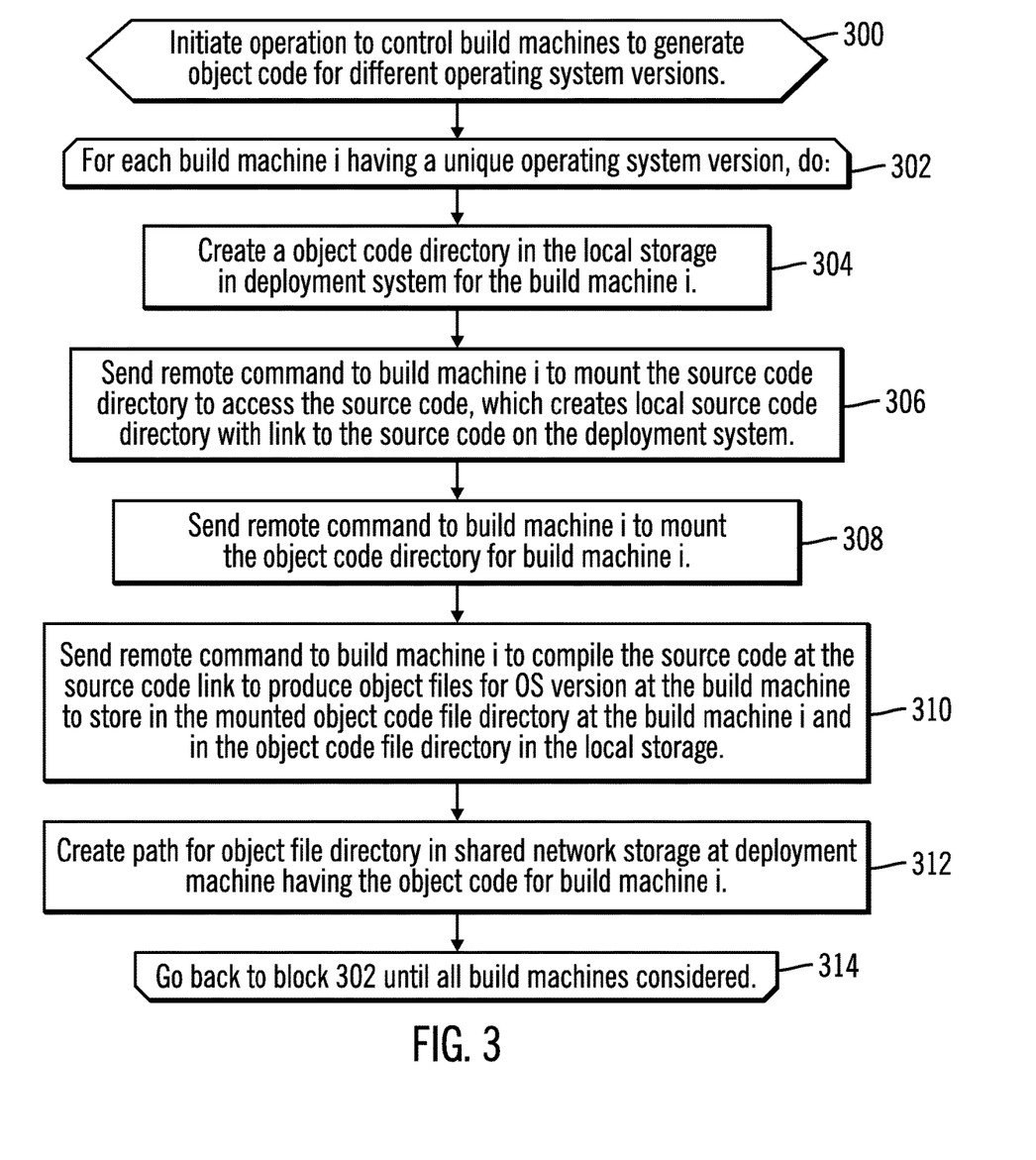
FIG. 3 illustrates an embodiment of operations to deploy source code to build machines to generate object code for different operating system versions.

FIG. 3 illustrates an embodiment of operations performed by the code deployment tool 126 using the network file management services $124_D$ in the deployment system 100 to control the build machines $108_1 \ldots 108_n$ to compile the source code 104 into object code $114_i$ for different operating systems $128_B$ at the build machines $108_i$. Upon initiating (at block 300) an operation to generate object code for different operating systems, the code deployment tool 126 performs a loop of operations at blocks 302 through 314 for each build machine $108_i$. An object code directory $114_i$ is created (at block 304) in the local storage $102_D$ in the deployment system 100 for build machine $108_i$ to mount to store its compiled object code files using network file system protocols and service $124_D$. The code deployment tool 126 sends (at block 306) a remote command to build machine $108_i$ to mount the source code directory $106_B$ in the shared network storage $103_B$ to access the source code 104 there, which creates a local source code directory 106 at the build machine $108_i$ with a link to the source code $104_B$, such as a symbolic link to the actual source code files 104 in the local storage $102_D$. A mount command to mount directories and folders creates an association between directories and files on different network systems, such that a user can use a path in a mounted folder locally to access the associated folder or files on another network system.

The code deployment tool 126 sends (at block 308) a remote command to build machine $108_i$ to mount the object code directory $114_i$ created for build machine $108_i$ to use for the object code files $112_i$ generated by build machine $108_i$. The code deployment tool 126 sends (at block 310) a remote command to build machine $108_i$ to compile the source code 104 to produce object code files $112_i$ for the operating system (OS) $128_B$ version at the build machine $108_i$ that are stored in the object code directory $114_B$ for build machine $108_i$ and copied transparently to the deployment system object code directory $114_i$ for build machine $108_i$ in the local storage $102_D$. The code deployment tool 126 creates (at block 312) the path for the object directory $114_i$ in the shared network storage $103_D$ at the deployment system 100 having the object code files $112_i$ for build machine 202 in field 208.

With the embodiment of operations of FIG. 3, the centrally stored source files 104 at the deployment system 100 are accessed through the shared network storage $103_D$ in the local storage $102_D$ by the build machines $108_i$ to generate object code files $112_i$ specific to the different heterogeneous operating systems $128_B$ at the build machines $108_i$. The object code files $112_i$ for the different operating systems generated in the build machine local storage $102_B$ are sent back to the object code directory $114_i$ at the deployment system 100 for centralized storage and management. In this way, virtual build machines may be deployed with limited resources, including a compiler 136, while the source code 104 and object code $112_i$ physical files are maintained remotely on the shared network storage $103_D$.

Figure 4:
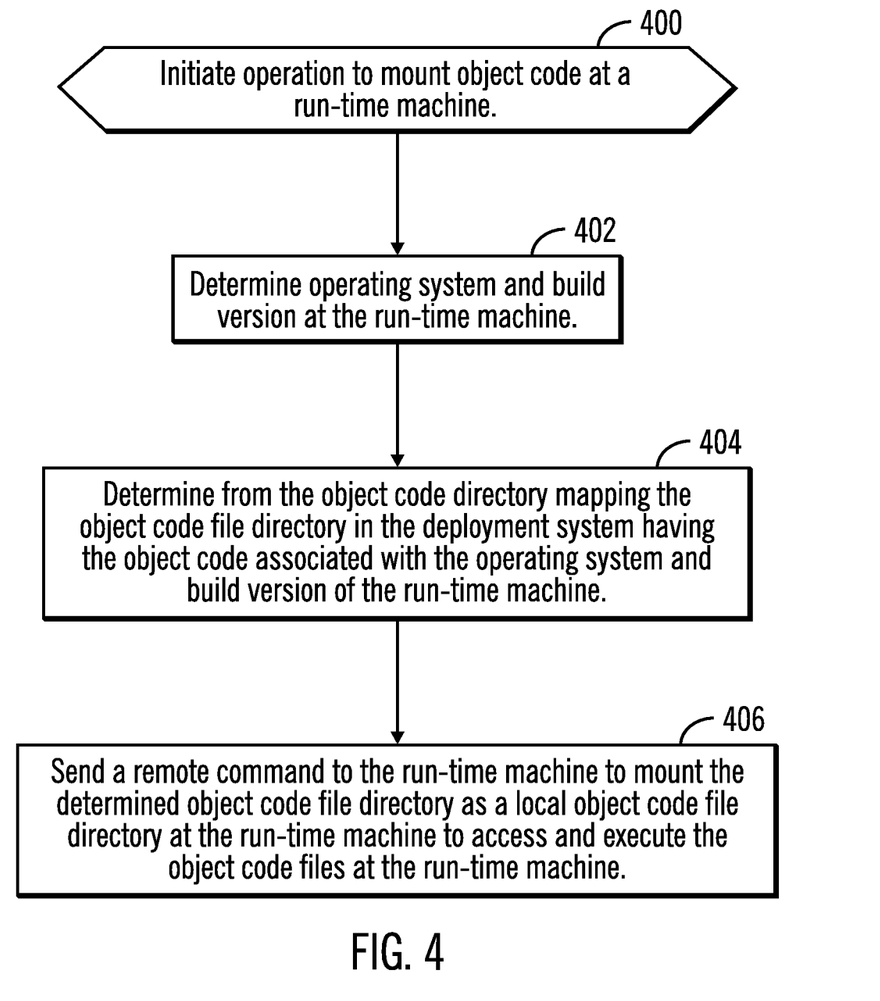
FIG. 4 illustrates an embodiment of operations to deploy the object code generated for different operating system versions to run-time machines to execute or test.

FIG. 4 illustrates an embodiment of operations to mount the object code directory $114_i$ and object code files $112_j$ at the deployment system 100 to a run-time machine $116_j$ to perform operations, such as to test the object code at the operating system $128_{RT}$ implemented in the run-time machine $116_j$. Upon initiating (at block 400) an operation to mount the object code directory $114i$ at a run-time machine $116_j$, the code deployment tool 126 determines (at block 402) an operating system and build version at the run-time machine $116_j$. A determination is made (at block 404) from the object code directory mappings 200 of the object code file directory 208 having the object code files $112_j$ associated with the operating system 204 and build version 206 at the run-time machine $116_j$. A remote command is sent (at block 406) to the run-time machine $116_j$ to mount the determined object code file directory $114_i$ as object code directory $114_T$ at the run-time machine $116_j$ with the object code files $112_T$ to access and execute the object files $112_j$ that are stored in the shared network storage $103_D$ at the deployment system 100.

With the embodiment of operations of FIG. 4, a single copy of the object code files $112_i$ is maintained in the shared network storage $103_D$ on the deployment system 100 for access by different run-time machines $116_j$ to execute or test the object code files.

Figure 5:
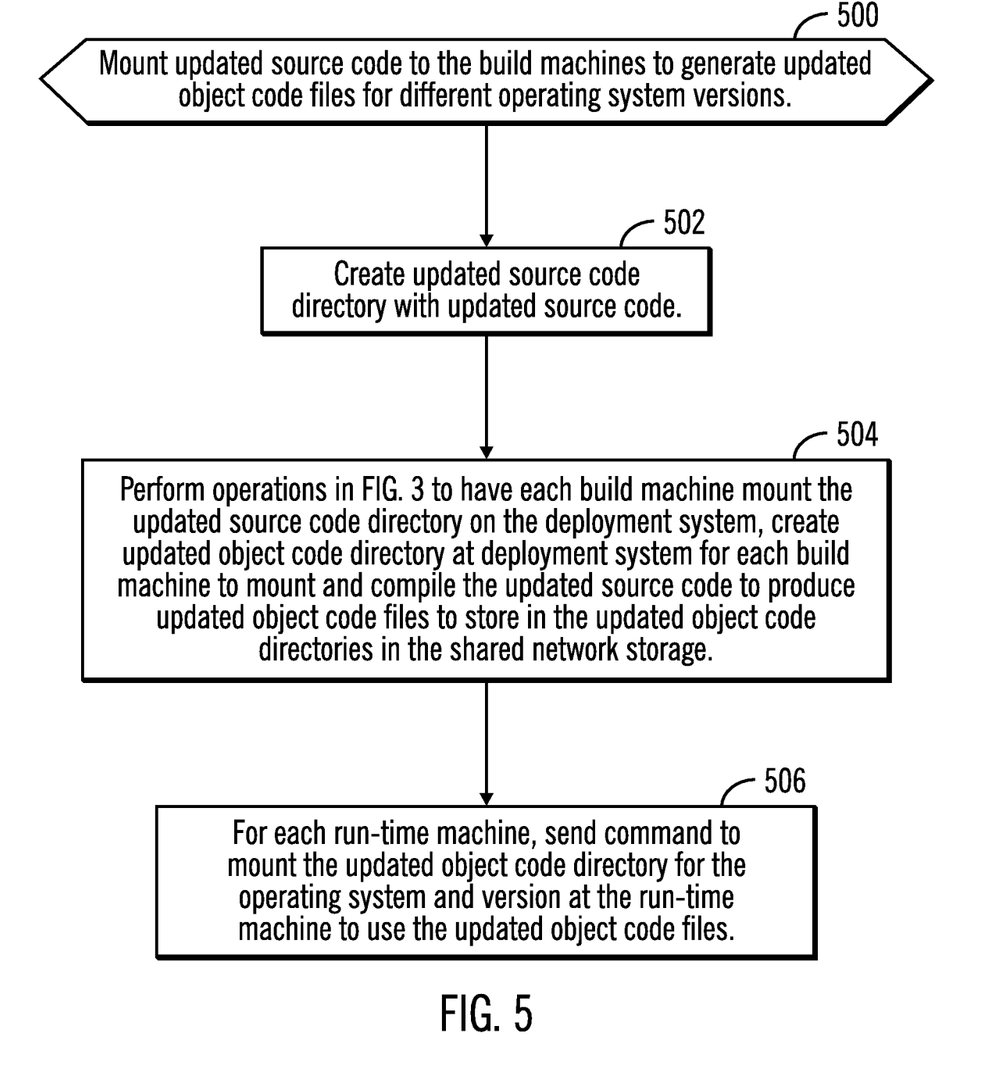
FIG. 5 illustrates an embodiment of operations to deploy updated source code to build machines to generate updated object code.

FIG. 5 illustrates an embodiment of operations performed by the code deployment tool 126 at the deployment system 100 to update the source code 104. Upon updating (at block 500) the source code 104, the code deployment tool 126 may create (at block 502) a new source code directory $106_U$ to store the updated source code $104_U$, leaving the previous source code directory $106_P$ available to store the previous version of the source code $104_P$. Alternatively, the source code may be updated in the same directory 106. Upon updating the source code 104, the code deployment tool 126 performs (at block 504) the operations in FIG. 3 to have each build machine $108_i$ mount the updated source code directory $106_U$ (or current source code directory having the updated source code 104), create updated object code directory $114_i$ at deployment system 100 for each build machine $108_i$ to mount and compile the updated source code $104_U$ to produce updated object code files $112_B$ to transfer back to the deployment system 100 using the network file system protocol $124_D$, $124_B$ to store in the updated object code directories $114_i$ for the build machines $108_i$ in the local storage $102_D$. In one embodiment, updated object code files $112_i$ may be stored in new object file directories to save the previous version of the object code files in their object code file directories. Alternatively, the same object code directories $114_i$ that store the previous version of the object code files may store the updated object code files $112_i$.

For each run-time machine $116_j$, the code deployment tool 126 may send a command to the run-time machines $116_1 \ldots 116_m$ to mount the updated object code directory $114_j$ at the run-time machine $116_j$ to execute the updated object code files $112_j$. Alternatively, if the same object code directory $114_j$ is used for the updated source code files used for the previous version, then there is no need to remount the object code file directory, and instead the command is sent to the run-time machines $116_j$ to execute run new object code files $112_j$ updated in the mounted object code file directory $114_j$.

With the embodiment of FIG. 5, one copy of the object code files is maintained in the local storage $102_D$ of the deployment system 100, which may then be deployed to one or more run-time machines to execute for testing or other purposes. This embodiment provides efficient storage of a single copy of the object code files at the deployment system 100 to mount at the run-time machines to execute. This also allows for the run-time machines $116_j$ to comprise storage limited virtual machines that execute the object code files stored at the deployment system 100 and exported to the run-time machines via the network file system services (protocols) $124_D$, $124_{RT}$.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
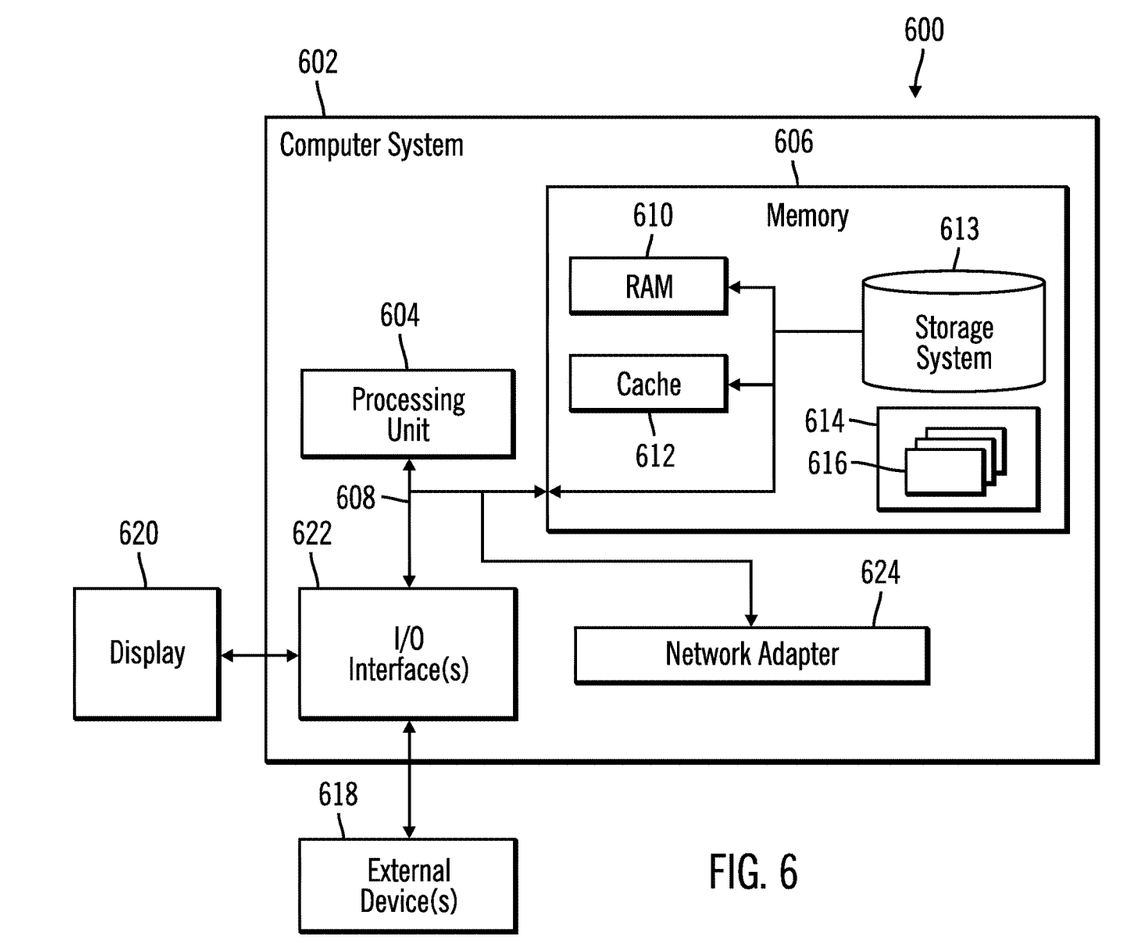
FIG. 6 depicts a computing environment in which the components of FIG. 1 may be implemented.

The computational components of FIG. 1, including the deployment system 100, build machines 108$_1$ . . . 108$_n$, and run-time machines 116$_1$ . . . 116$_m$ may be implemented in one or more computer systems, such as the computer system 602 shown in FIG. 6. In a further embodiment, some or all of the deployment system 100, build machines 108$_1$ . . . 108$_n$, and run-time machines 116$_1$ . . . 116$_m$ may be implemented in virtual machines in a virtual machine host such as shown in FIG. 6. Alternatively, the build machines and run-time machines may comprise virtual machines implemented in physical machines, such as shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A system for managing deployment of source and object code, comprising:
   a processor; and
   a computer readable storage medium having computer readable program instructions executed by the processor to perform operations, the operations comprising:
   maintaining source code at a deployment system;
   sending mount commands to build machines to have the build machines mount a source code file directory in the deployment system having the source code the build machines compile;
   after sending the mount commands, sending commands to the build machines to compile the source code into object code instances for different operating systems at the build machines, wherein the build machines have different operating systems to compile the object code instances for the different operating systems installed on the build machines;
   receiving, from the build machines, the object code instances;
   storing, at the deployment system, an object code instance for each build machine in an object code file directory for the build machine to provide executable object code for an operating system installed at the build machine, wherein different object code file directories are maintained for the object code instances compiled by the build machines having different operating systems; and
   providing access to the object code instances in the object code file directories to run-time machines, wherein each run-time machine accesses the object code file directory in the deployment system having an object code instance compiled for an operating system version deployed on the run-time machine.

2. The system of claim 1, wherein the providing access to the object code instances comprises:
   determining an operating system version of the operating system version deployed at a run-time machine; and
   determining, from a data structure, an object code file directory in the deployment system associated with an operating system version of the run-time machine, wherein the run-time machine accesses an object code instance from the determined object code file directory.

3. The system of claim 2, wherein the providing access to the object code instances comprises:
   sending a mount command to the run-time machine to mount the determined object code file directory having the object code instance for the operating system version of the run-time machine, wherein the run-time machine executes the object code instance in the mounted determined object code file directory.

4. The system of claim 1, wherein the operations further comprise for each build machine to which a command is sent to compile the source code:
   creating an object code file directory at the deployment system for the build machine, wherein the build machine compiles the source code into an object code instance that is copied to the object code file directory in the deployment system.

5. The system of claim 1, wherein the operations further comprise:
   storing an update of the source code as updated source code;
   in response to storing the updated source code, performing:
   sending commands to the build machines to have the build machines compile the updated source code into updated object code instances;
   storing, at the deployment system, an updated object code instance for each build machine of the build machines in an updated file directory of the build machine to provide executable updated object code instance for the operating system installed at the build machine; and
   sending commands to the run-time machines to mount the updated object code instances from the updated file directories in the deployment system.

6. A method for managing deployment of source and object code, comprising:
   maintaining source code at a deployment system;
   sending mount commands to build machines to have the build machines mount a source code file directory in the deployment system having source code the build machines compile;
   after sending the mount commands, sending commands to the build machines to compile the source code into object code instances for different operating systems at the build machines, wherein the build machines have the different operating systems to compile the object code instances for the different operating systems installed on the build machines;
   receiving, from the build machines, the object code instances;
   storing, at the deployment system, an object code instance for each build machine in an object code file directory for the build machine to provide executable object code for an operating system installed at the build machine, wherein different object code file directories are maintained for the object code instances compiled by the build machines having the different operating systems; and
   providing access to the object code instances in the object code file directories to run-time machines, wherein each run-time machine accesses the object code file directory in the deployment system having an object code instance compiled for an operating system version deployed on the run-time machine.

7. The method of claim 6, wherein the providing access to the object code comprises:
   determining an operating system version of the operating system version deployed at a run-time machine; and
   determining, from a data structure, an object code file directory in the deployment system associated with an operating system version of the run-time machine, wherein the run-time machine accesses an object code instance from the determined object code file directory.

8. The method of claim 7, wherein the providing access to the object code instances comprises:
   sending a mount command to the run-time machine to mount the determined object code file directory having the object code instance for the operating system version of the run-time machine, wherein the run-time machine executes the object code instance in the mounted determined object code file directory.

9. The method of claim 6, for each build machine to which a command is sent to compile the source code, further comprising:
creating an object code file directory at the deployment system for the build machine, wherein the build machine compiles the source code into an object code instance that is copied to the object code file directory in the deployment system.

10. The method of claim 6, further comprising:
storing an update of the source code as updated source code;
in response to storing the updated source code, performing:
sending commands to the build machines to have the build machines compile the updated source code into updated object code instances;
storing, at the deployment system, an updated object code instance for each build machine of the build machines in an updated file directory of the build machine to provide an executable updated object code instance for the operating system installed at the build machine; and
sending commands to the run-time machines to mount the updated object code instance from the updated file directories in the deployment system.

11. A computer program product for managing deployment of source and object code, wherein the computer program product comprises a computer readable storage medium having computer readable program instructions executed by a processor to perform operations, the operations comprising:
maintaining source code at a deployment system;
sending mount commands to build machines to have the build machines mount a source code file directory in the deployment system having the source code the build machines compile;
after sending the mount commands, sending commands to the build machines to compile the source code into object code instances for different operating systems at the build machines, wherein the build machines have the different operating systems to compile the object code instances for the different operating systems installed on the build machines;
receiving, from the build machines, the object code instances;
storing, at the deployment system, an object code instance for each build machine in an object code file directory for the build machine to provide executable object code for an operating system installed at the build machine, wherein different object code file directories are maintained for the object code instances compiled by the build machines having the different operating systems; and
providing access to the object code instances in the object code file directories to run-time machines, wherein each run-time machine accesses the object code file directory in the deployment system having an object code instance compiled for an operating system version deployed on the run-time machine.

12. The computer program product of claim 11, wherein the providing access to the object code instances comprises:
determining an operating system version of the operating system version deployed at a run-time machine; and
determining, from a data structure, an object code file directory in the deployment system associated with an operating system version of the run-time machine, wherein the run-time machine accesses an object code instance from the determined object code file directory.

13. The computer program product of claim 12, wherein the providing access to the object code instances comprises:
sending a mount command to the run-time machine to mount the determined object code file directory having the object code instance for the operating system version of the run-time machine, wherein the run-time machine executes the object code instance in the mounted determined object code file directory.

14. The computer program product of claim 11, wherein the run-time machines comprise test systems to test the object code instances as part of development of the source code to determine the object code instances, compiled from the source code, executes on different operating system versions on the test systems.

15. The computer program product of claim 11, wherein the operations further comprise for each build machine to which a command is sent to compile the source code:
creating an object code file directory at the deployment system for the build machine, wherein the build machine compiles the source code into an object code instance that is copied to the object code file directory in the deployment system.

16. The computer program product of claim 11, wherein the different operating systems comprise at least one of different builds of a same operating system or different operating systems.

17. The computer program product of claim 11, wherein run-time machines having a same operating system version are provided access to a same object code file directory at the deployment system having an object code instance for the same operating system version.

18. The computer program product of claim 11, wherein the operations further comprise:
storing an update of the source code as updated source code;
in response to storing the updated source code, performing:
sending commands to the build machines to have the build machines compile the updated source code into updated object code instances;
storing, at the deployment system, an updated object code instance for each build machine of the build machines in an updated file directory of the build machine to provide an executable updated object code instance for the operating system installed at the build machine; and
sending commands to the run-time machines to mount the updated object code instances from the updated file directories in the deployment system.

* * * * *